US006643336B1

(12) United States Patent
Hsieh et al.

(10) Patent No.: US 6,643,336 B1
(45) Date of Patent: Nov. 4, 2003

(54) DC OFFSET AND BIT TIMING SYSTEM AND METHOD FOR USE WITH A WIRELESS TRANSCEIVER

(75) Inventors: Hsiang-Tsuen Hsieh, San Diego, CA (US); Jyothis S. Indirabhai, San Diego, CA (US)

(73) Assignee: Widcomm, Inc., San Diego, CA (US)

( * ) Notice: Subject to any disclaimer, the term of this patent is extended or adjusted under 35 U.S.C. 154(b) by 0 days.

(21) Appl. No.: 09/551,495

(22) Filed: Apr. 18, 2000

(51) Int. Cl.[7] .............................. H03H 7/30; H03H 7/40
(52) U.S. Cl. ....................... 375/343; 375/319; 375/371; 370/206; 370/324
(58) Field of Search ................................. 375/343, 319, 375/368, 202, 371; 320/115; 370/206, 324, 476, 347; 455/278.1, 463

(56) References Cited

U.S. PATENT DOCUMENTS

| | | | |
|---|---|---|---|
| 4,405,829 A | | 9/1983 | Rivest et al. ............... 178/22.1 |
| 5,241,702 A | * | 8/1993 | Dent ........................ 455/278.1 |
| 5,276,706 A | * | 1/1994 | Critchlow .................... 375/343 |
| 5,422,917 A | * | 6/1995 | Scott ........................... 375/371 |
| 5,490,139 A | | 2/1996 | Baker et al. .................. 370/60 |
| 5,572,528 A | | 11/1996 | Shuen ........................ 370/85.13 |

(List continued on next page.)

FOREIGN PATENT DOCUMENTS

| EP | 0695059 A1 | 1/1996 |
|---|---|---|
| WO | WO 99/14897 | 3/1999 |

OTHER PUBLICATIONS

Specification of the Bluetooth System, (Jul. 1999).*
Seiichi Sampei et al., "Adaptive DC–Offset Compensation Algorithms For Burst Mode Operated Direct Conversion Receivers", Proceedings of the Vehicular Technology Society Conference, vol. 1, May 10, 1992, pp. 93–96, New York, US.

Tsurumi H et al., "System–Level Compensation Approach To Overcome Signal Saturation, DC Offset, and $2^{nd}$–Order Nonlinear Distortion In Linear Direct Conversion Receiver ", Ieice Transactions on Electronics Of Electronics Information And Comm. Engineering, vol. E82–C, No. 5, May 1999, 708–715, XP000919541, Tokyo, Japan.

Haartsen, Jaap, "Bluetooth–The universal radio interface for ad hoc, wireless connectivity," *Ericsson Review*, No. 3, pp. 110–117, (1998).

"Specification of the Bluetooth System , Core, Version 1.0B," *Bluetooth SIG Specifications*, pp. 18–42, (Dec. 1, 1999).

Haartsen, Jaap, "Bluetooth–The universal radio interface for ad hoc, wireless connectivity," *Ericsson Review*, No. 3, pp. 110–117, (1998).

Haartman, Jaap, "Bluetooth—the universal radio inferface for ad hoc, wireless connectivity", Ericsson Review, Se, Ericsson (3) :110–117, (1998).

Specification of the Bluetooth System, (Jul. 1999).

"PMDF System Manager's Guide PMDF–Ref. 5.1," http://www.geneseo.edu/pmdf.sysman/book 1.html#chapter 1, (Mar. 16, 1999).

*Primary Examiner*—Stephen Chin
*Assistant Examiner*—Edith Yeh
(74) *Attorney, Agent, or Firm*—Cooley Godward LLP

(57) ABSTRACT

An offset estimation and bit timing system and method configured to detect a DC offset in a received signal is disclosed herein. The inventive system includes a first circuit for receiving and correlating a transmitted signal and generating a trigger signal in response thereto. A second circuit accumulates the received signal and provides a second signal on receipt of the trigger signal. The second signal is then converted to an offset error signal. The error signal is converted to analog and used as a reference input for an A/D converter. As an alternative, the error signal may be used to adjust the signal output by an intermediate frequency downconversion stage.

11 Claims, 9 Drawing Sheets

U.S. PATENT DOCUMENTS

| | | | |
|---|---|---|---|
| 5,636,216 A | 6/1997 | Fox et al. | 370/402 |
| 5,638,399 A * | 6/1997 | Schuchman et al. | 370/324 |
| 5,652,751 A | 7/1997 | Sharony | 370/227 |
| 5,696,903 A | 12/1997 | Mahany | |
| 5,699,353 A | 12/1997 | Kent | 370/315 |
| 5,708,655 A | 1/1998 | Toth et al. | 370/313 |
| 5,742,598 A | 4/1998 | Dunn et al. | 370/393 |
| 5,754,547 A | 5/1998 | Nakazawa | 370/401 |
| 5,809,009 A * | 9/1998 | Matsuoka et al. | 370/206 |
| 5,812,531 A | 9/1998 | Cheung et al. | 370/255 |
| 5,825,772 A | 10/1998 | Dobbins et al. | 370/396 |
| 5,835,061 A | 11/1998 | Stewart | 342/457 |
| 5,845,081 A | 12/1998 | Rangarajan et al. | 395/200 |
| 5,850,592 A | 12/1998 | Ramanathan | |
| 5,854,899 A | 12/1998 | Callon et al. | 395/200 |
| 5,983,098 A | 11/1999 | Gerszberg et al. | 455/426 |
| 6,255,800 B1 * | 7/2001 | Bork | 320/115 |
| 6,353,641 B2 * | 3/2002 | Macq et al. | 375/319 |

* cited by examiner

DC OFFSET AND BIT TIMING SYSTEM AND METHOD FOR USE WITH A WIRELESS TRANSCEIVER

BACKGROUND OF THE INVENTION

The present invention relates to systems and methods for wireless data transmission. More specifically, the present invention relates to systems and methods for improving DC offset and bit timing in Bluetooth enabled wireless transceivers.

DESCRIPTION OF THE RELATED ART

A wireless technology called 'Bluetooth' is under development to enable ease of synchronization and mobility for a plethora of corporate and consumer applications. Bluetooth technology will open up many possibilities for quick, temporary (ad-hoc) connections with colleagues, devices, or office networks. Bluetooth is described in BLUETOOTH SPECIFICATION VERSION 1.0A CORE, published in July 1999.

On the receive side, Bluetooth transceivers downconvert the received signals to baseband for further processing. One processing step involves the use of correlation algorithms to improve signal-to-noise ratio (S/N). Unfortunately, certain current Bluetooth transceiver designs offer limited performance at baseband. In particular, performance limitations have been observed with respect to clock recovery and direct current (DC) offset. Clock recovery refers to the process by which a received data stream is synchronized with a local clock to facilitate recovery of the transmitted data. DC offset at baseband is often caused by a frequency offset at the receiver relative to the transmitter. DC offset estimation is required to eliminate a residual DC signal resulting from the process of downconverting the received signal to baseband.

Hence, a need exists in the art for a system or technique for compensating for DC offset at baseband due to frequency offsets and to improve bit timing synchronization in Bluetooth enabled and other wireless transmission schemes.

SUMMARY OF THE INVENTION

The need in the art is addressed by the offset estimation and bit timing system and method of the present invention. The inventive offset estimation system includes a first circuit for receiving and correlating a transmitted signal and generating a trigger signal in response thereto. A second circuit accumulates the received signal and provides a second signal on receipt of the trigger signal. The second signal is then converted to an offset error signal.

In an illustrative implementation, the offset estimation system is implemented in a Bluetooth enabled wireless receiver adapted to receive a signal transmitted with a known bit pattern. The received signal includes a plurality of messages, each message having at least one access code and each access code having a predetermined pattern therein for at least a portion thereof. The offset estimation system analyses the bit pattern and detects the DC offset in the received signal.

In the illustrative embodiment, the first circuit includes an analog to digital (A/D) converter having a sampling rate of N samples per bit period. The A/D converter digitizes the first signal and provides a digital input signal in response to an analog reference signal. The digital input signal is next processed to provide a correlated output signal. A peak and an edge in the correlated output signal are identified and a trigger signal is provided in response thereto. In the best mode, the trigger signal is provided at a time T=N/2 after a time of identification of the peak.

The illustrative DC offset estimation system further includes a sliding window accumulator for providing an accumulated output signal. The accumulated output signal is latched and output on receipt of the trigger signal. Finally, the latched signal is used as an address to a lookup table which outputs and an error signal in response thereto. The error signal is converted to analog and used as a reference input for the A/D converter. As an alternative, the error signal may be used to adjust the signal output by an intermediate frequency downconversion stage.

In any event, the inventive system further includes a novel arrangement for providing clock recovery and bit timing with respect to the received signal. The novel bit timing system includes a first circuit for receiving and correlating the first signal with a set of weights and providing a correlated signal in response thereto. The weights are chosen to achieve the highest correlation with respect to the predetermined bit pattern in the transmitted signal. A second circuit is included for identifying a peak in the correlated signal and providing a bit timing output signal in response thereto. The bit timing output signal is then used by a data bit sampler for sampling data in the first signal.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
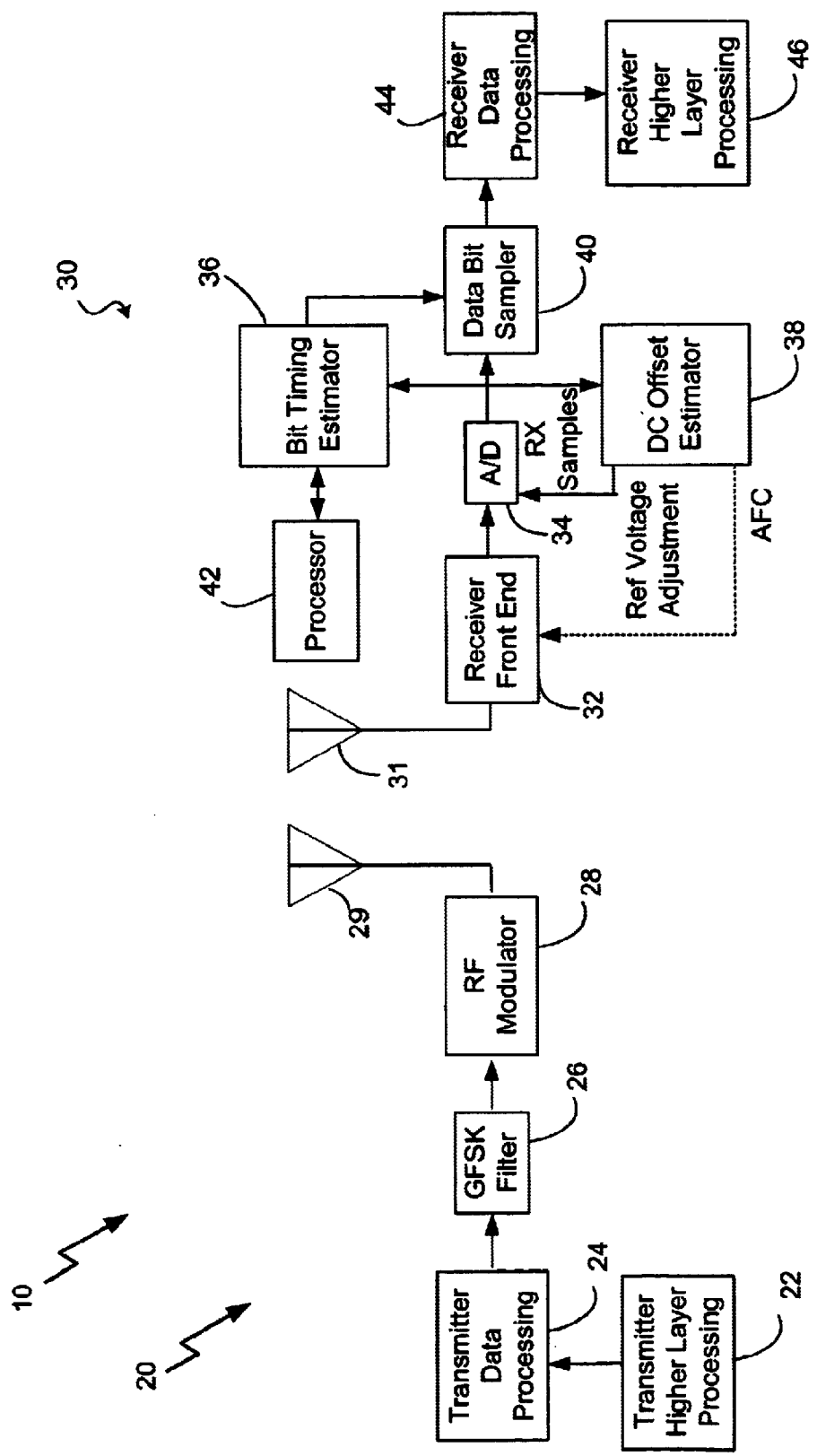
FIG. 1 is a block diagram of a wireless system implemented in accordance with the teachings of the present invention.

FIG. 1 is a block diagram of a wireless system implemented in accordance with the teachings of the present invention. In the preferred embodiment, the system 10 is a Bluetooth enabled system. Nonetheless, those skilled in the art will appreciate that the teachings of the present invention may be utilized in other system architectures without departing from the scope thereof.

The system 10 includes a transmitter 20 and a receiver 30. The transmitter 20 is implemented in accordance with conventional teachings and includes first and second processing layers 22 and 24. The first processing layer 22 a higher processing layer and includes a protocol layer and an application layer. The second processing layer 24 is a data processing layer for FEC encoding, Whiting CRC (cyclic redundancy checking) and etc. Typically, the data processing layer 24 feeds a Gaussian Frequency Shift Keying filter 26 and a radio frequency (RF) modulator 28. The RF modulated signal is then transmitted via an antenna 29.

Figure 2:
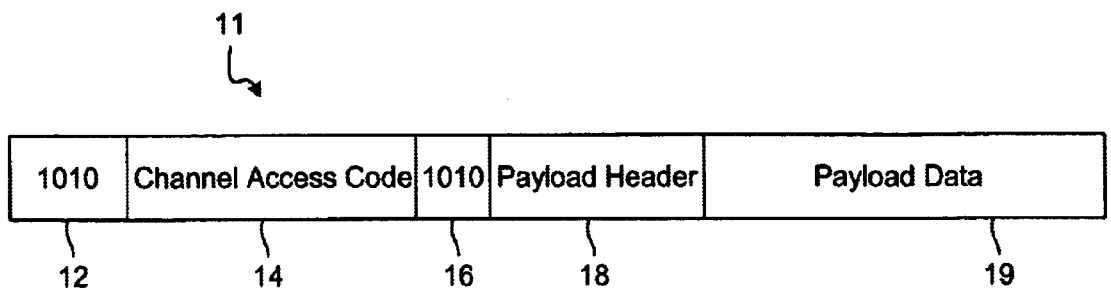
FIG. 2 is a diagram showing the format of an access code word utilized in the system of the present invention.

In accordance with the present teachings, the transmitter 20 transmits a signal of the form shown in FIG. 2.

FIG. 2 is a diagram showing the format of an access code word utilized in the system of the present invention. In accordance with the present teachings, and as discussed more fully below, the transmitter sends a code word 11 having a preamble 12 of alternating logical zeros and ones or vice versa. The preamble 11 is followed by a channel access code 14. The preamble is repeated at 16 and elsewhere throughout the code word 11 as necessary or desired for a given application. As is common in the art, the access code 14 is followed by a payload header 18 and payload data 19. In accordance with the present teachings, the preamble and the access code are used to facilitate bit timing synchronization and DC offset correction in the manner discussed more fully below.

The transmitted signal is received by an antenna 31 of the receiver 30. The receive antenna 31 feeds a receiver front end stage 32 which is implemented in accordance with conventional teachings. That is, the front end stage 32 typically includes a downconverter, a low noise amplifier (LNA), a limiter and a discriminator. The output of the front end stage 32 is digitized by an analog-to-digital converter 34. The A/D sampling rate is N samples per bit period (N times over-sampling).

In accordance with the present teachings, digitized received data samples from the A/D converter 34 are provided to a bit timing estimator 36, a DC offset estimator 38 and a data sampler 40. As discussed more fully below, the bit timing estimator 36 is driven by a processor 42.

As per the transmission scheme, the output of the data bit sampler 40 is processed by a data processing layer 44 and a higher layer processing stage 46. As per conventional teachings, the data processing layer 44 performs FEC decoding, De-Whiting, and CRC decoding. The higher layer processing 46 performs protocol layer and application layer processing in a conventional manner.

As mentioned above, a DC offset is caused by a frequency offset between the transmitter 20 and the receiver 30, combined with any DC components added along the receive path. The DC offset effect seen at the baseband receiver input is actually the DC component of the analog signal relative to the reference voltage of the A/D converter. In another words, if the A/D converter reference voltage equals the DC component of the analog waveform, the DC offset seen at the A/D output will be zero. Therefore, the purpose of the DC offset estimation module is to estimate the DC offset from the digital signal. According to the present teachings and as discussed more fully below, the preamble is used to estimate DC offset at the receiver. The estimate is then used to tune the receiver by either adjusting the reference voltage for the A/D 34 or, alternatively, at the front end 32 through an AFC (automatic frequency control) signal.

Further, in accordance with the present teachings and as discussed more fully below, bit timing is optimized by analyzing the received signal for a correlation between the received signal and a correlation template. The correlate template can be the full channel access code or a portion of the channel access code. The correlation peak yields the optimal sampling time for the data bits in the payload portion 19 of the received signal. Hence, particularly novel aspects of the present invention are the bit timing and the DC offset estimators 36 and 38, respectively.

Figure 3:
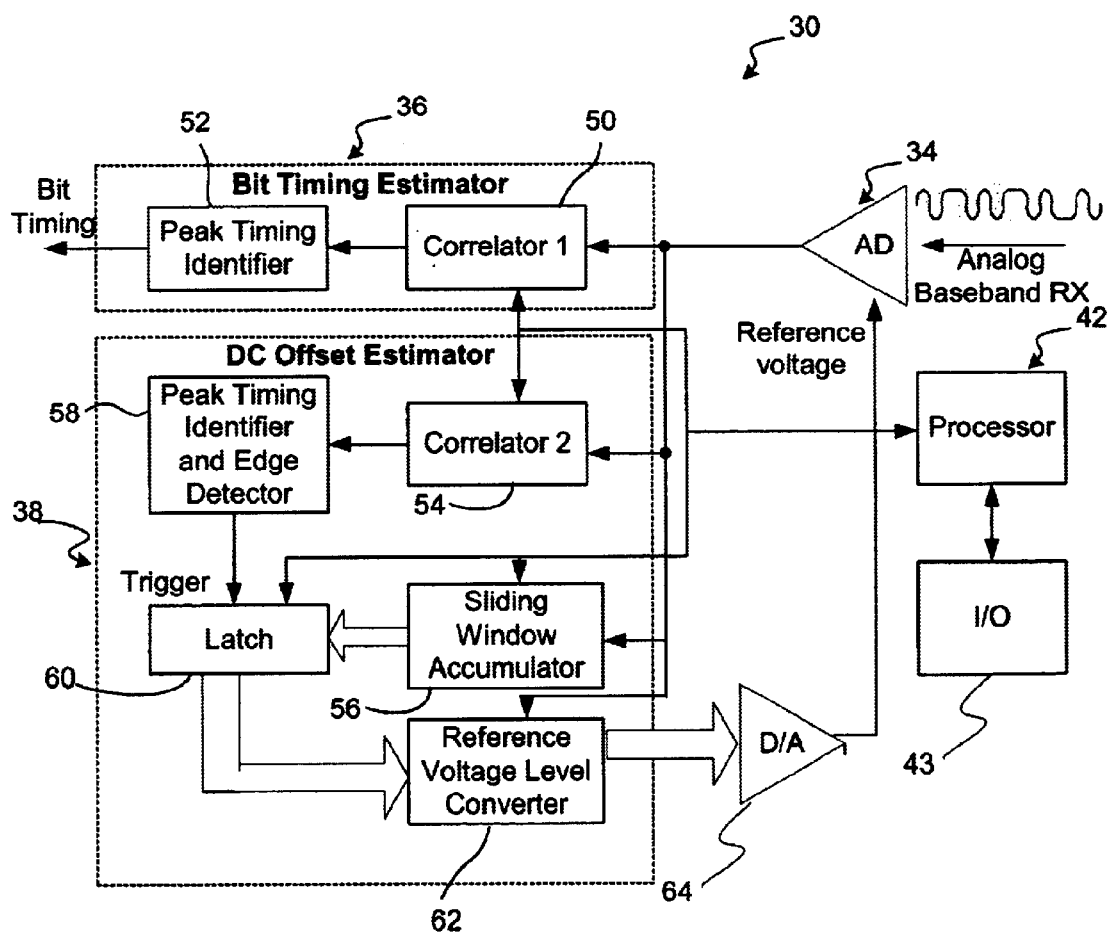
FIG. 3 is a functional block diagram of an illustrative implementation of the bit timing and DC offset estimators in accordance with the teachings of the present invention.

FIG. 3 is a functional block diagram of an illustrative implementation of the bit timing and DC offset estimators in accordance with the teachings of the present invention. The bit timing estimation subsystem 36 consists of a first (bit timing) correlator 50 and a peak detector 52.

The A/D converter 34 provides input to the bit timing correlator 50 in the bit timing estimator 36. The A/D converter 34 also provides input to a second (DC offset) correlator 54 (correlator 2) and a sliding window accumulator 56 disposed in the DC offset estimation subsystem 38. As discussed more fully below, the first correlator 50 searches the digitized data stream for the presence of the channel access code 14 in each code word 11 sent by the transmitter 20 and received by the receiver 30. The second correlator 54 examines the digitized data stream for the presence of the preamble 12 in each code word 11 (i.e., in the illustrative embodiment, a "1010" pattern).

Figure 4:
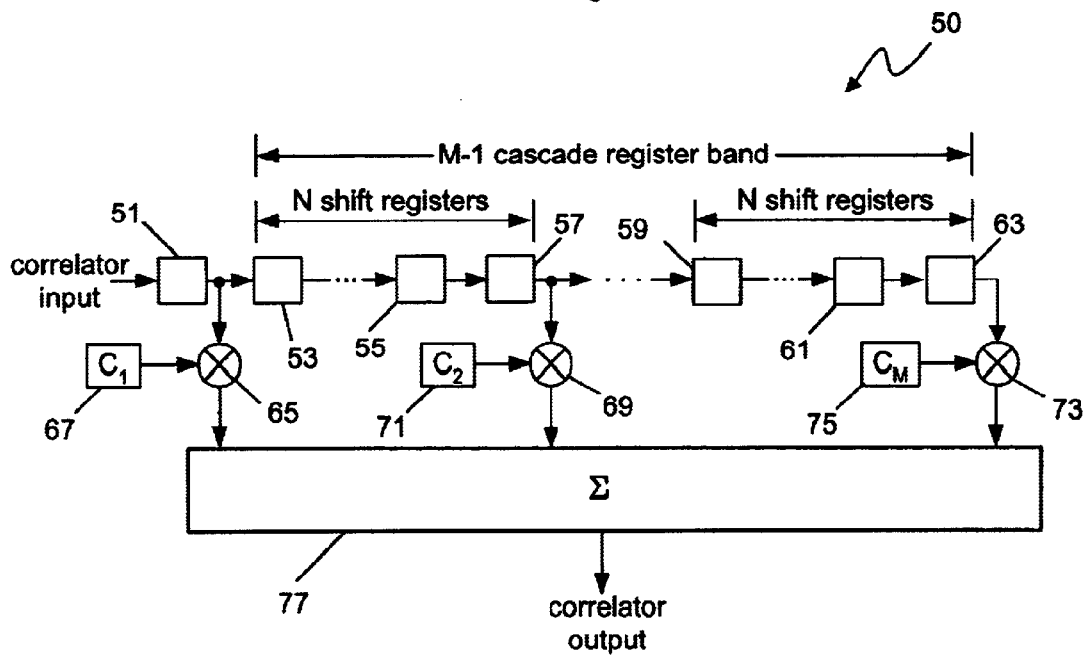
FIG. 4 is a block diagram showing an illustrative implementation of the bit timing correlator in detail.

FIG. 4 is a block diagram showing an illustrative implementation of the bit timing correlator in detail. In the illustrative embodiment, the bit timing correlator 50 is implemented with N×(M−1)+1 shift registers 51–63 (odd numbers only) connected in a cascade arrangement, where N is the sampling rate of the A/D converter 34 as mentioned above. The shift registers 51–63 store incoming data samples from the A/D converter 34. For the case of a baseband A/D conversion with only one bit resolution, each shift register is implemented with a flip-flop.

The data samples stored in the shift registers are correlated with coefficients $c_1$, $c_2$ through $c_M$ via a multiplication operation implemented with exclusive-NOR (XNOR) gates (65, 69, 73 and etc.), respectively, where the correlation pattern is $C_j$, j=1, 2, . . . M. The correlator coefficients ($C_j$) are stored in shift registers 67, 71 . . . 75 and etc. The correlator 50 matches M bits from the access code pattern where, in the illustrative embodiment, M=1, 2 . . . 64. Those skilled in the art will appreciate that the illustrative implementation of the bit timing correlator 50 allows for the template (or the bit pattern for correlation) to be configurable and downloadable based on a desired access code.

As discussed more fully below, the next step in the correlation involves a summation operation using a counter 77. The counter 77 counts the number of 1s at the output of exclusive-NOR gates. When the input binary samples entering the exclusive-NOR gates 65, 69, 73 and etc. correlate with the access code stored in the shift registers 67, 71 ... 75 and etc., respectively, the output of the counter 77 will be at a peak. The peak timing identifier 52 then processes the output of the bit timing correlator 50 to find this peak in the correlated data values.

The peak is identified by comparing the correlated values result against a threshold using conventional peak detector. When a peak is detected, the peak location provides an initial sampling time for bit timing. The output of the bit timing correlator 50 has the same sampling rate as the A/D sampling rate. Accordingly, the subsequent data bits can be optimally sampled at every N samples after the peak location. This optimal sampling time will not change for the duration of the packet.

It should be noted that depending on the length M of correlator 50, the peak location may not be at the end of the access code. For example, if the length M=64, the peak location will be the end of the access code and the first bit in the packet header can be sampled at the fifth bit time slot after the peak location (to skip over the preamble "1010" or "0101" tail bits). If M is less than 64, 64−M+4 bits has to be skipped to go to the packet header field.

Returning to FIG. 3, in the illustrative embodiment, the DC offset estimation subsystem 38 includes a second (DC offset) correlator 54, a second peak timing identifier 58, a latch 60, a sliding window accumulator 56, and a reference voltage level converter 62.

Figure 5:
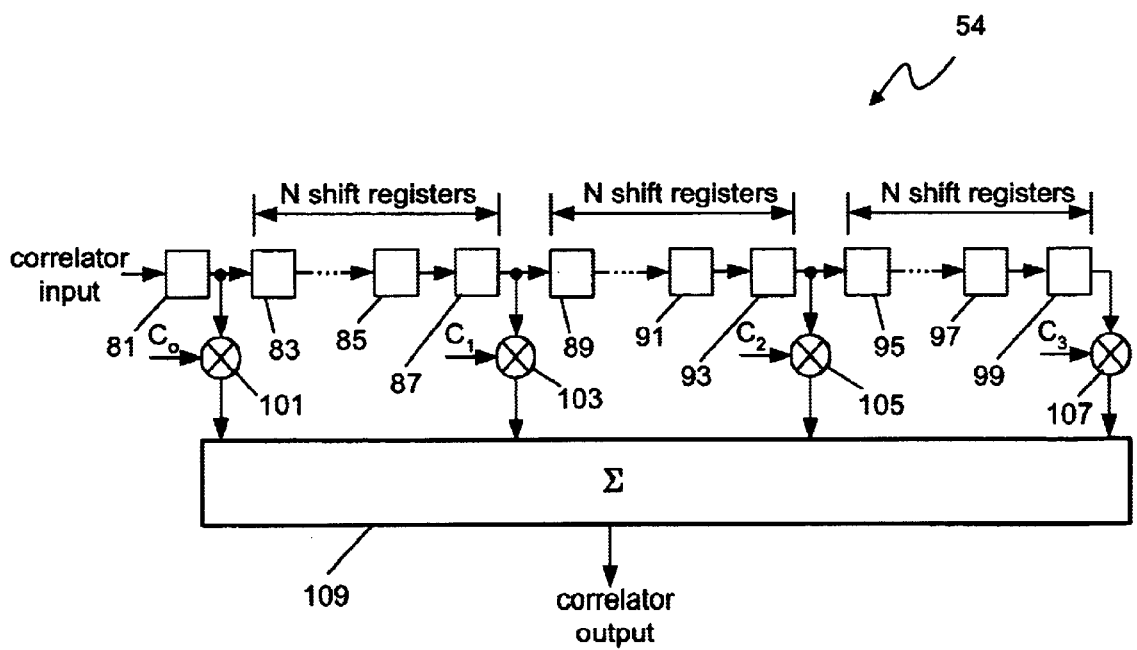
FIG. 5 is a block diagram showing an illustrative implementation of the DC offset estimation correlator in detail.

FIG. 5 is a block diagram showing an illustrative implementation of the DC offset estimation correlator in detail. The illustrative implementation of the DC offset estimation correlator 54 is similar to that of the bit timing correlator 50. That is, the DC offset correlator 54 includes N×3+1 shift registers 81–99 (odd numbers only) connected in cascade to store the incoming digitized data samples. The coefficients $c_0$, $c_1$, $c_2$ and $C_3$ shown in FIG. 5 and used in the illustrative embodiment for DC offset estimation are $c_0=0$, $c_1=1$, $c_2=0$, $c_3=1$. For the case of a baseband A/D converter 34 with only one bit resolution, each shift register is implemented using a flip-flop, the multiplication is implemented using exclusive-NOR gates 101–107 (odd numbers only) and the summation is implemented using a counter 109. The counter 109 counts number of 1s at the output of 4 exclusive-NOR gates 101–107 (odd numbers only). When the input binary samples entering the 4 exclusive-NOR gates are equal to the preamble 12 in the code word 11 (i.e., 1010) the counter output will be at it peak with a value of 4.

Figure 6:
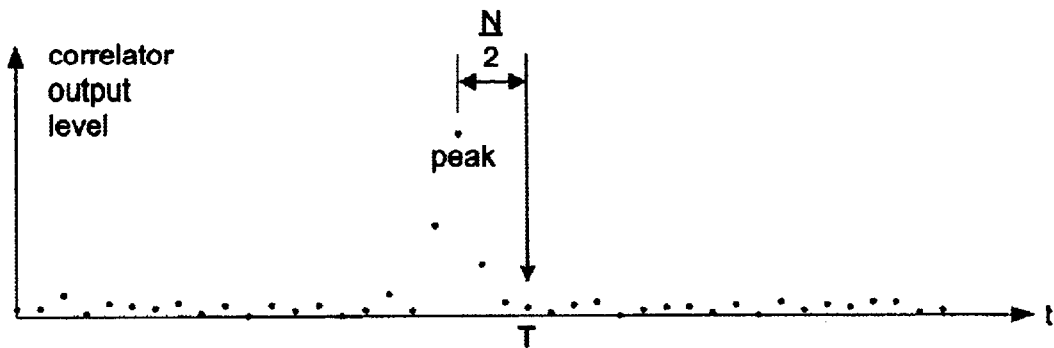
FIG. 6 is a diagram illustrative of the output of the DC offset correlator utilized in the inventive system.

FIG. 6 is a diagram illustrative of the output of the DC offset correlator 54. The output of the DC offset correlator 54 is a time domain sequence with the same rate as the A/D sampling rate. The output of the DC offset correlator 54 is input to a peak timing identifier and edge detector 58.

The peak timing identifier and edge detector 58 detects the peak location and calculates the time T (shown in FIG. 6) at N/2 samples after the peak location. The trigger signal generated by the peak timing identifier and edge detector 58 will be at the timing T (shown in FIG. 6) which is N/2 samples after the peak timing. This function can be implemented either in software running on a processor, with gates in a FPGA (field programmable gate array) or ASIC (application specific integrated circuit). A threshold should be used to qualify the peak; i.e. the peak has to be higher than a threshold to be considered as a peak. Practically, since only the 4-bit preamble 12 (the 1010 pattern) is used for correlation (the correlator2 54), the threshold should be set to be 4. Thereafter, the candidate values are compared to identify the peak. On detection of the peak, a trigger signal will be generated by the peak timing identifier and edge detector 58.

As shown in FIG. 3, the trigger signal is received by a latch 60 and used to latch the output of the sliding window accumulator 56. In the preferred embodiment, the trigger signal is generated at time T shown in FIG. 6.

Figure 7:
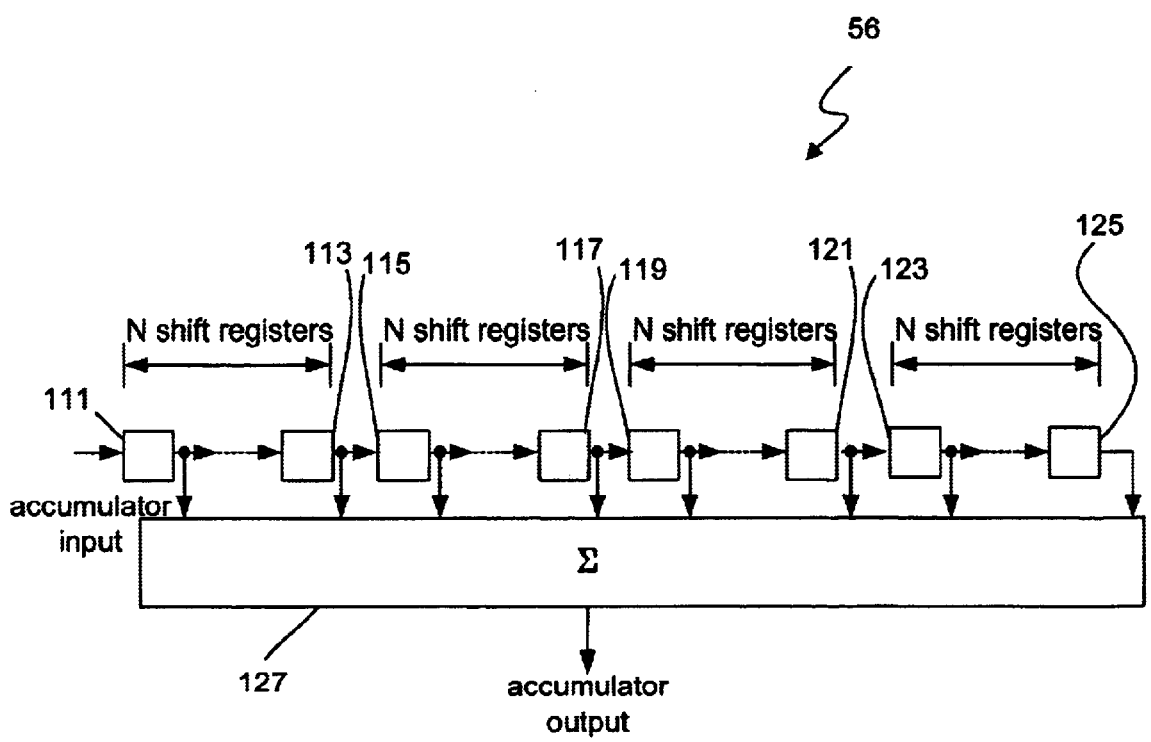
FIG. 7 is a diagram showing the structure of the sliding window accumulator utilized in the inventive system.

The structure of the sliding window accumulator is shown in FIG. 7. The accumulator 56 is similar to the correlators 50 and 54 in construction with the exception that it does not employ the use of XNOR gates. That is, the accumulator 56 includes a plurality of shift registers 111–125 arranged in a cascade form which feed a summer 127. For the illustrative case of an analog to digital converter 34 having one bit resolution, the shift registers 111–125 are implemented with flip-flops and the summation is implemented using a counter. When the DC offset correlator 54 and peak timing identifier 58 find the preamble, the value stored in the sliding window accumulator 56 is latched for output. As illustrated in FIG. 7, the width of the window used by the sliding window accumulator is set by the number of shift registers, which is a period of 4 bits.

Returning to FIG. 3, if the bit pattern is "1010" and sampling rate is 4 times oversampling, an output value of 8 from the latched 60 corresponds to no DC offset. A smaller value indicates the reference voltage is higher than the DC component of the analog signal and a value higher than 8 indicates that the reference voltage is too low relative to the DC component of the analog signal.

In any event, the latched accumulator output is converted to a proper control signal by a reference voltage level converter 62. The reference voltage level converter 62 may be implemented with a lookup table. On receipt of the output of the sliding window accumulator, the converter 62 looks up an appropriately scaled voltage to be fed back to the A/D converter 34 via a digital-to-analog converter 64 as a reference voltage to control the DC offset seen in the digital domain.

As mentioned above, as an alternative, a signal can be generated converter 62 for AFC feedback control, based on the estimated DC offset, to adjust the frequency of the IF stage in the receiver front end 32 illustrated in FIG. 1. This approach involves a change in the DC component of the analog signal to match the reference voltage for the A/D converter.

A processor 42 receives input via an interface 43 and provides weights for the first and second correlators 50 and 54 allow for system reconfiguration.

Figure 8:
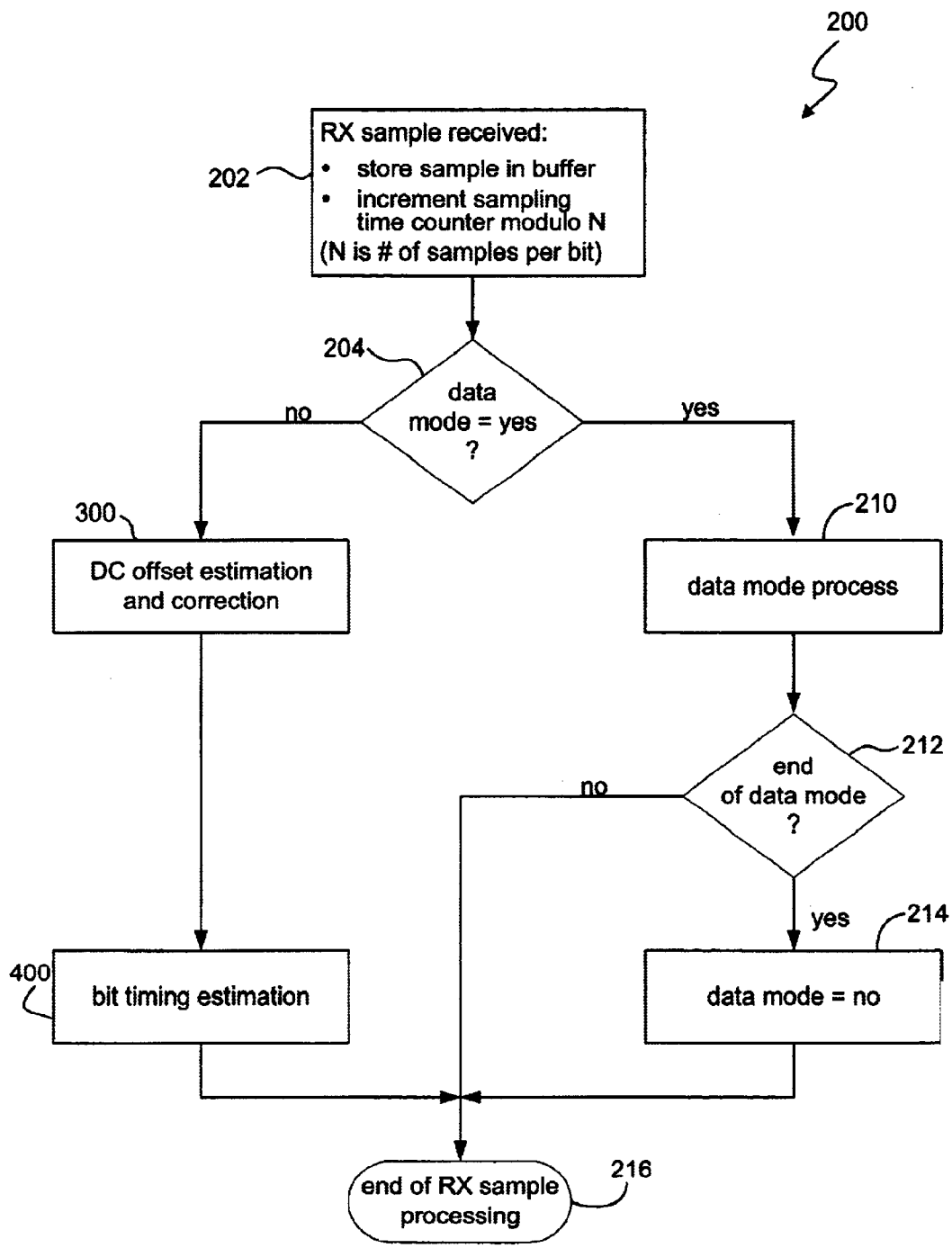
FIG. 8 is a flow diagram of an illustrative implementation of the bit timing and DC offset methods of the present invention.
Figure 9:
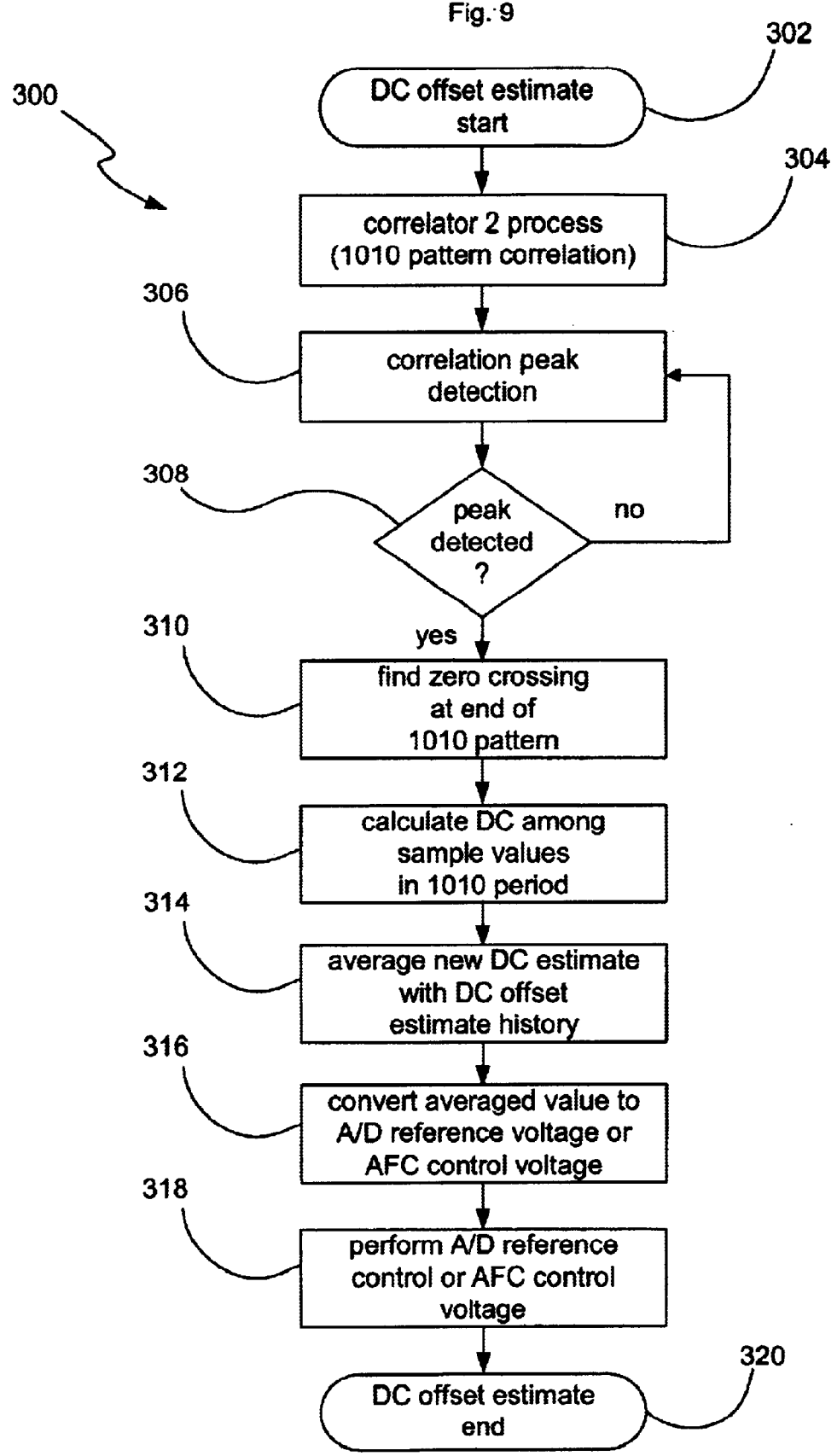
FIG. 9 is a flow diagram illustrative of the DC offset estimation method of the present invention.
Figure 10:
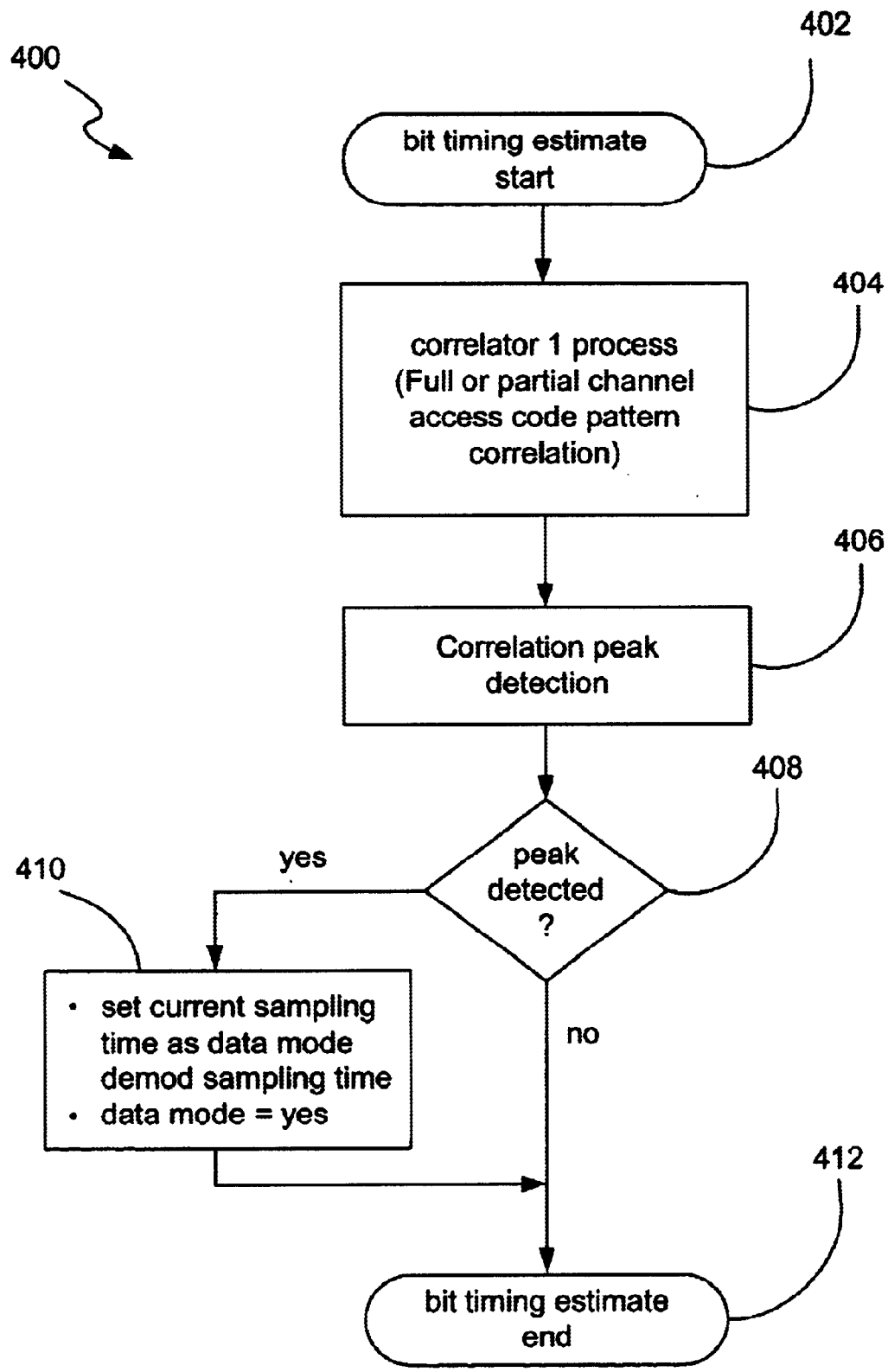
FIG. 10 is a flow diagram illustrative of the bit timing method of the present invention.

The method of operation of the inventive system is illustrated in FIGS. 8–10.

FIG. 8 is a flow diagram of an illustrative implementation of the bit timing and DC offset methods of the present invention. As illustrated in FIG. 8, the method 200 includes the step 202 of receiving the transmitted signal, storing samples in a buffer and incrementing a time counter modulo N. At step 204, the system checks for data mode. If data mode is not set, at step 300, the system performs DC offset estimation and correction.

FIG. 9 is a flow diagram illustrative of the DC offset estimation method of the present invention. At step 304 correlator 2 (FIG. 3) processes the signal looking for the preamble 12. At step 306, the output of the correlator is processed for peak detection by the peak timing identifier 58 of FIG. 3. If the peak is detected, at step 308, the system checks for a zero crossing at the end of the preamble at step 310. Next, at step 312, the DC value is calculated at step 312. As is well known in the art, the DC value is calculated by averaging the sample values. At step 314, the new DC estimated value is averaged with the DC offset estimate history by the processor 42. This is achieved by adding the accumulator output to an accumulated sum each time when it is latched and then divide the accumulated sum by the number of times the 1010 bit pattern is detected during the channel access code period. At step 316, the averaged value is converted to a reference voltage by the converter 62 and at step 318, output as a reference voltage for the A/D converter 34 of an AFC control voltage for the RF front end 32.

Returning to FIG. 8, at step 400, bit timing estimation is next performed. FIG. 10 is a flow diagram illustrative of the bit timing method of the present invention. At step 404, correlator 1 processes the received data samples and performs full or partial channel access code pattern correlation. At step 406, the peak timing identifier 52 (FIG. 3) looks for a peak in the correlation. On the detection of a peak, at step 410, the system sets current sampling time as data mode demodulation sampling time and the data mode flag will be set. The sampling time refers to the timing of the sample to be used for each bit duration. More specifically, if the number of samples per bit is N, then the bit timing correlator (correlator1 50) peak timing marks the timing that every N samples after the peak will be used as the bit sampled for each bit period. Note that, the correlation output yields by the correlator1 50 at the peak may show a flat level for several sampling times. If this happens, the mid-point sample timing of the flat period will be chosen to be the ture peak timing. If the peak is not detected at step 408, the data mode remains "no".

Returning to FIG. 8, when, at step 204 the data mode is found to be "yes", then at step 210, the system processes the received data. In FIG. 1, data output by the A/D converter is sampled by a bit sampler 40 with timing provided by the bit timing estimator 36. The output of the bit sampler 40 is processed by a receiver data processor 44. As mentioned above, the receiver data processor 44 performs FEC decoding, De-Whiting, and CRC checking. Next, the higher layer processor 46 performs protocol and application layer processing until the end of the received signal processing at step 216 in FIG. 8.

OPERATION

DC Offset Estimation

Figure 11:
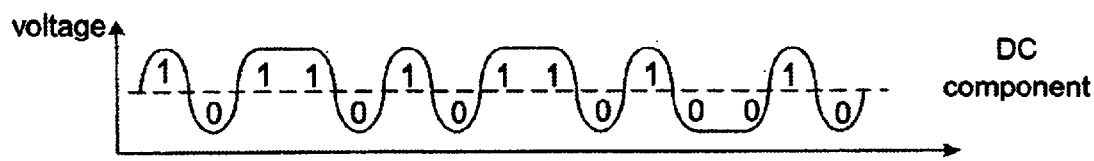
FIG. 11 shows an example of the analog baseband signal to be digitized with a DC component therein.

FIG. 11 shows an example of the received analog baseband signal with a DC component therein to be digitized at the baseband receiver using the A/D 34. The AC component of the waveform in FIG. 11 is the result of 1 and 0 digital patterns generated by the transmitter 20 passing through the GFSK filter 26 before the RF modulator 28. Again, for the illustrative embodiment, the A/D 34 is assumed to have only one-bit resolution. Those skilled in the art will appreciate that the present teachings can be directly applied to an A/D with N-bit resolution without departing from the scope thereof. Ideally, the system will adjust the A/D reference voltage to be equal to the DC level of the analog input signal. This is depicted in FIG. 12 below.

Figure 12:
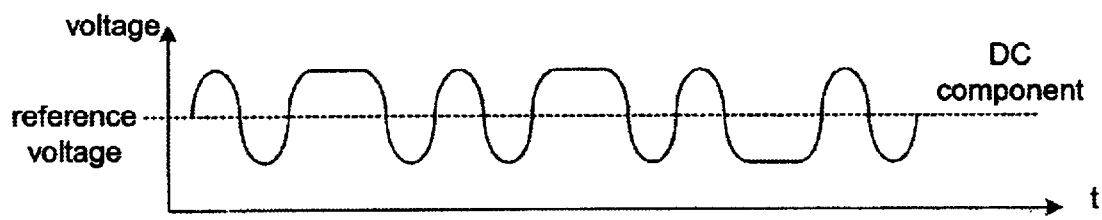
FIG. 12 is a diagram showing an optimal reference voltage level for the A/D operation.

FIG. 12 is a diagram showing an optimal reference voltage level for the A/D operation. In this case, the reference voltage equals the DC component of the analog signal.

Figure 13:
FIG. 13 is a diagram showing the output of the A/D converter corresponding to the analog waveform depicted in FIG. 12.

FIG. 13 is a diagram showing the output of the A/D converter corresponding to the analog waveform depicted in FIG. 12. Note that, 4 times over-sampling is used as an exemplary A/D sampling rate for the illustrative embodiment. (Those skilled in the art will appreciate that the present teachings are not limited to any particular sampling rate.) The digitized output shows equally distributed 1s and 0s.

Figure 14:
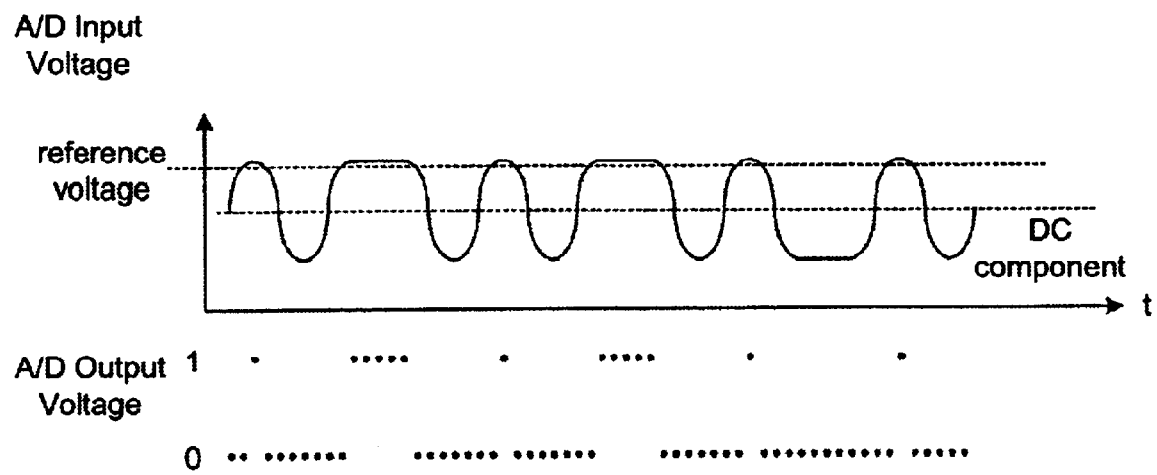
FIG. 14 shows a digitized waveform resulting from an incorrect reference voltage setting.

If the reference voltage of the A/D is not set to be the DC component of the analog signal, the result of the A/D output will be biased as shown in FIG. 14.

FIG. 14 shows a digitized waveform resulting from in incorrect reference voltage setting. FIG. 14 shows the resulting asymmetrical distribution of 1s and 0s.

As discussed above, the DC estimation system and method of the present invention searches for a predetermined bit pattern, i.e., the preamble 12, and uses this pattern for DC offset estimation. The bit pattern should be a certain pattern where DC offset can be estimated from the digital RX signal generated by that pattern. The illustrative pattern "1010" is such a pattern that can be used for DC offset estimation.

Figure 15:
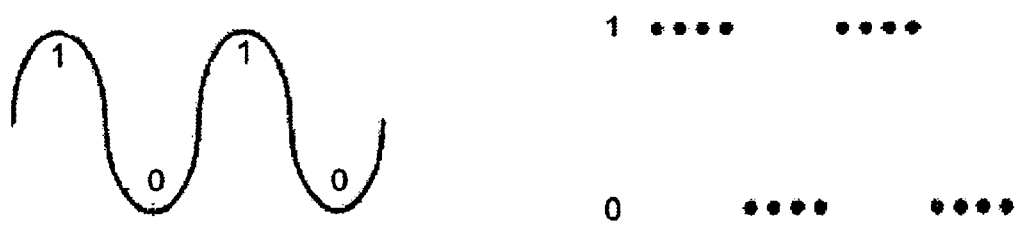
FIG. 15 is a diagram showing analog and digitized waveforms corresponding to "1010" pattern.

FIG. 15 is a diagram showing analog and digitized waveforms corresponding to "1010" pattern. In FIG. 15, it is assumed that the DC offset at the digital output is zero. Correlator 2 identifies the "1010" patterns in the manner discussed above. When the pattern is identified, a trigger signal is generated that latches the sliding window accumulator output value. The sliding window accumulator accumulates the same period of signals corresponding to "1010" bit patterns. For the case of 4 times over-sampling rate, the sliding window accumulator adds the most current 16 samples if "1010" is the pattern for DC offset estimation.

The trigger will be generated at time T shown in FIG. 6. If the "1010" pattern in FIG. 15 is considered, the time trigger occurs exactly at the moment where the output of the accumulator is the sum of the 16 digital samples shown in FIG. 15.

If the bit pattern is "1010" and sampling rate is 4 times over-sampling, an output value of 8 from the latched counter output corresponds to no DC offset. A smaller value indicates the reference voltage is higher than the DC component of the analog signal, and a value bigger than 8 indicates the reference voltage is too low relative to the DC component of the analog signal.

As discussed above, the latched accumulator output is converted to a proper control signal for feeding back to the analog circuit to control the DC offset seen at the digital waveform.

The DC offset estimation unit should be activated as soon as the system (e.g. Bluetooth) slot-processing window begins. It should remain active during the access code portion or it can be active for the entire packet receiving period. During its active period, it continuously searches for the pre-determined bit pattern and adjusts the analog circuit whenever the bit pattern is detected. If multiple bit patterns are detected, the estimated DC offset from different patterns should be averaged to give a better DC offset estimation.

Bit Timing Estimation

As mentioned above, in FIG. 3, correlator 1 matches M bits from the access code pattern where M=1, 2 . . . 64. The peak timing identifier 52 will process the output of correlator 1 to find the peak. The output of the correlator 1 has the same sampling rate as the A/D sampling rate. The peak will be checked against a threshold. Once a peak is detected, the peak location is exactly the best sampling time for bit slicing. The rest of the data bits can be sampled at every N samples after the peak location. The best sampling time will not be changed for the entire packet duration.

Depending on the length M of correlator 1, the peak location may not be the end of the access code. For example, if the length M=64, the peak location will be the end of the access code and the first bit in the packet header can be sampled at the fifth bit timing after the peak location (to skip over the "1010" or "0101" tail bits). If M is less than 64, 64−M+4 bits has to be skipped to go to the packet header field.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention. Accordingly,

What is claimed is:

1. A system for estimating an offset in a signal comprising:

first means for receiving and correlating a first signal and generating a trigger signal in response thereto, wherein said first means further includes:
means for digitizing said first signal to provide a digital input signal in response to an analog reference signal, said means for digitizing comprising an analog to digital converter having a sampling rate of N samples per bit period,
means for correlating said digital input signal to provide a correlated output signal,
means for identifying a peak in said correlated output signal and providing said trigger signal in response thereto, and
means for finding an edge in said correlated output signal and providing said trigger signal in response thereto;

second means for accumulating said first signal and providing a second signal on receipt of said trigger signal; and third means for converting said second signal to an offset error signal.

2. The invention of claim 1 wherein said trigger signal is provided at a time T=N/2 after a time of identification of said peak.

3. A wireless receiver adapted to estimate a direct current offset in a received signal, said receiver, being included within a system having a wireless transmitter adapted to transmit a first signal with a predetermined bit pattern therein for a least a portion thereof, said receiver comprising:

first means for receiving and correlating a first signal and generating a trigger signal in response thereto, said first means including:
an analog to digital converter having a sampling rate of N samples per bit period for digitizing said first signal to provide a digital input signal in response to an analog reference signal and
means for correlating said digital input signal to provide a correlated output signal, said means for correlating further including means for identifying a peak in said correlated output signal and means for finding an edge in said correlated output signal and providing said trigger signal at a time T=N/2 after a time of identification of said peak in response thereto;

second means for accumulating said first signal and providing a second signal on receipt of said trigger signal, said second means including a sliding window accumulator; and third means for converting said second signal to an offset error signal, said third means further including means for converting said error signal to said analog reference signal.

4. The invention of claim 3 wherein said transmitter and said receiver are implemented in accordance with a Bluetooth Specification.

5. The invention of claim 3 wherein said pattern consists of alternating logical '0' and logical '1' bits for at least a portion thereof.

6. The invention of claim 5 wherein said first signal includes a plurality of messages, each message having at least one access code and each access code having said pattern therein for at least a portion thereof.

7. The invention of claim 3 further including a latch for providing said accumulated output signal on receipt of said trigger signal.

8. The invention of claim 7 wherein said third means includes means for comparing said second signal to a reference signal and generating error signal in response thereto.

9. The invention of claim 3 further including means for providing bit timing.

10. The invention of claim 9 wherein said means for providing bit timing includes means for correlating the output of said means for correlating said digital input signal to provide a correlated signal.

11. The invention of claim 10 wherein said means for providing bit timing further includes means for identifying a peak in said correlated signal to provide a bit timing output signal.

* * * * *